(No Model.)
G. H. SUMMERS.
ADJUSTABLE BIT AND DRILL CHUCK.
No. 265,990. Patented Oct. 17, 1882.
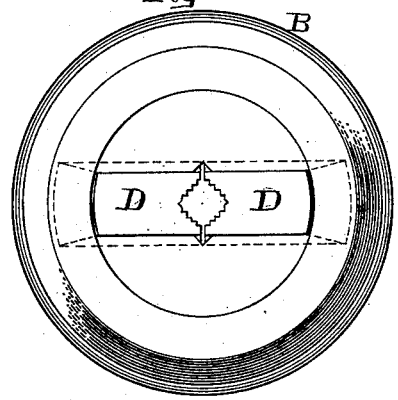
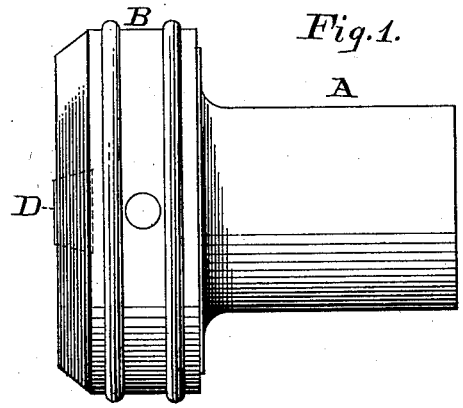
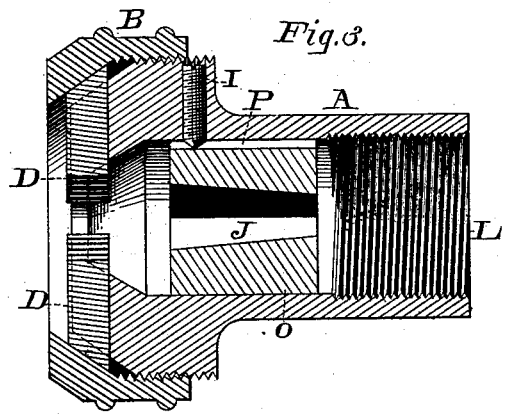

UNITED STATES PATENT OFFICE.

GEORGE H. SUMMERS, OF BELOIT, WISCONSIN.

ADJUSTABLE BIT AND DRILL CHUCK.

SPECIFICATION forming part of Letters Patent No. 265,990, dated October 17, 1882.

Application filed June 7, 1882. (No model.)

*To all whom it may concern:*

Be it known that I, GEORGE H. SUMMERS, a citizen of the United States, residing at Beloit, Rock county, Wisconsin, have invented certain new and useful Improvements in Adjustable Bit and Drill Chucks, of which the following is a specification.

My invention relates to improvements in adjustable bit and drill chucks in which I use a sliding adjustable centering socket-block inside a shank or mandrel and laterally-sliding jaws; and the objects of my invention are, first, to provide a chuck with a sliding socket-block that can be adjusted to tools of different sizes, shapes, and lengths; and, second, by the simplicity of my device to lessen the cost of manufacture.

I attain these objects by the device illustrated in the accompanying drawings, in which Figure 1 is a perspective view of the completed chuck. Fig. 2 is a front or end view, and Fig. 3 is a longitudinal sectional view.

Similar letters refer to like parts in the different views.

The shank shown at A, Figs. 1 and 3, is made hollow its entire length, and at one end has a thread cut on the inside at L for the purpose of fastening it to a lathe-arbor or brace.

O, Fig. 3, is the adjustable centering socket-block, made to fit the inside of the hollow shank. It can be moved toward the jaws D D, Fig. 3, or in the opposite direction, as will best fit the tool to be used. It is provided with a groove, P, to receive the point of the set-screw I, and when placed in the desired position is held in place by turning down the set-screw. In addition to the set-screw I, a thin nut may be turned into the thread L against the socket-block O to help hold it in place. The adjustable socket-block O has a tapering opening, J, Fig. 3, through its center, which may be round or square, or any shape best suited to fit the shank end of the tools to be used.

The shank A, Fig. 3, is enlarged at its face end and threaded on the outside to receive the collar B. It is also grooved across its face to receive the jaws D, Figs. 1, 2, and 3. A portion of the inner surface of the collar B, Fig. 3, is at an angle to fit the angle of the outer end of the jaws, so that the jaws may be forced toward the center to fasten the tool or allowed to slide back by simply turning the ring B to the right or left.

Bit and drill chucks as heretofore made have been complicated and too expensive for many uses for which such chucks are desired.

I do not claim as new the sliding jaws, as such or similar jaws have been used before; but What I do claim, and desire to secure by Letters Patent, is—

1. In a chuck provided with radially-moving jaws, an adjustable socket-block, substantially as shown, whereby adjustment may be made both for the length and for the diameter of a tool-shank.

2. The herein-described chuck, consisting of shank or body A, collar B, jaws D, adjustable socket-block O, and set-screw I, all combined and operating substantially as set forth.

GEORGE H. SUMMERS.

Witnesses:
J. B. DOW,
O. B. OLMSTED.